Dec. 16, 1952 R. F. SMITH 2,621,761
BRAKE SHOE ADJUSTING AND POSITIONING MEANS
Filed Aug. 20, 1949
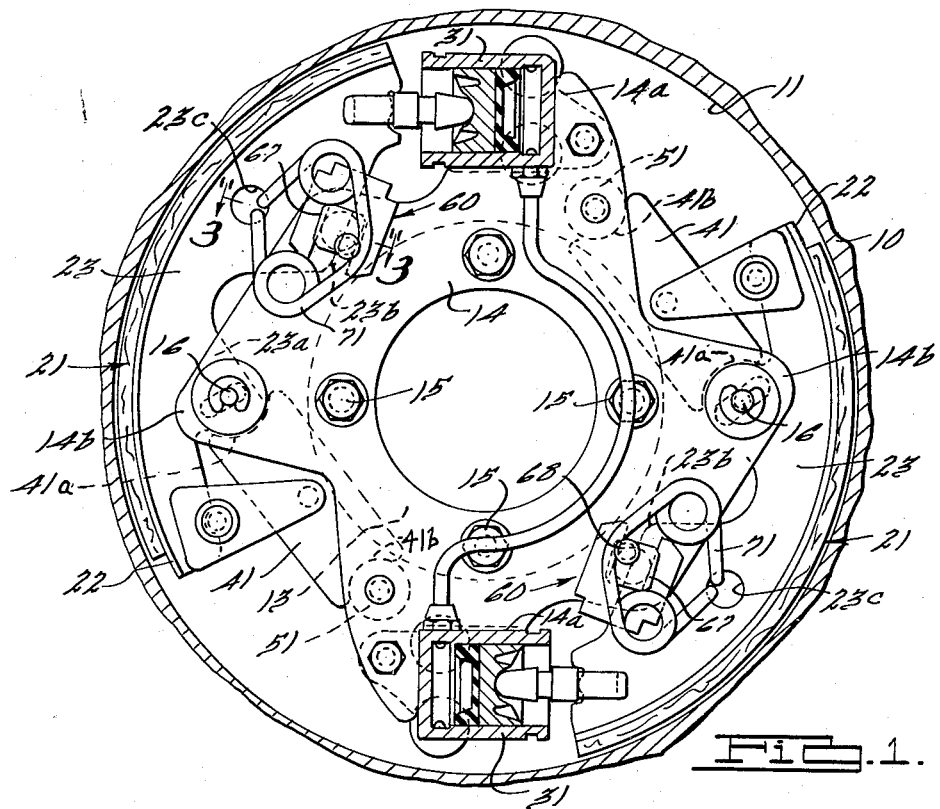
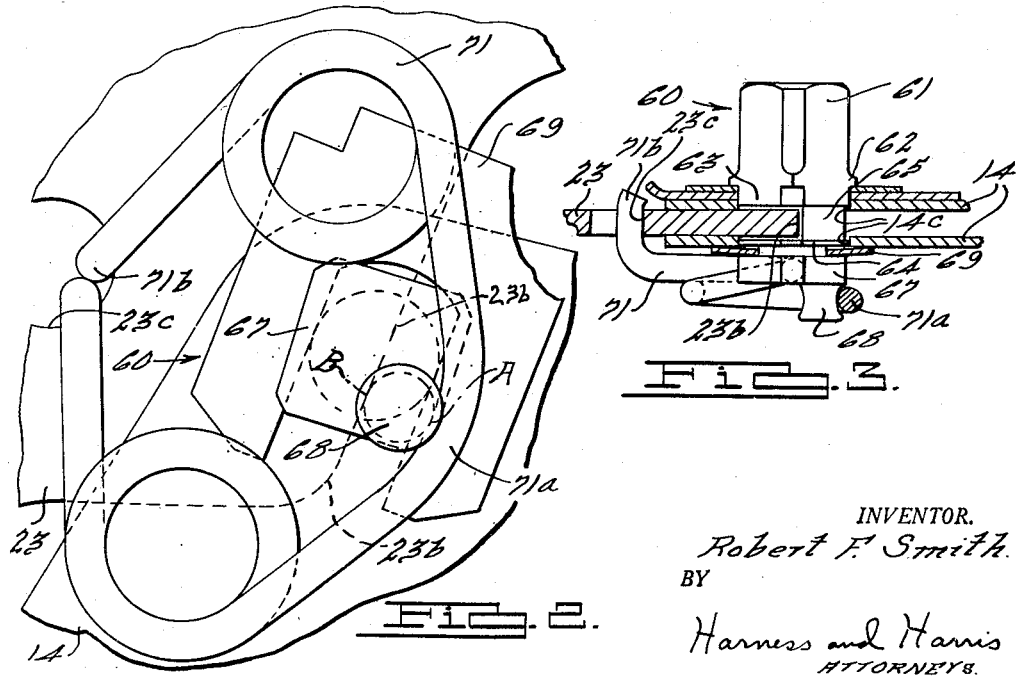
INVENTOR.
Robert F. Smith
BY
Harness and Harris
ATTORNEYS.

Patented Dec. 16, 1952

2,621,761

UNITED STATES PATENT OFFICE 2,621,761

BRAKE SHOE ADJUSTING AND POSITIONING MEANS

Robert F. Smith, Detroit, Mich., assignor to Chrysler Corporation, Highland Park, Mich., a corporation of Delaware Application August 20, 1949, Serial No. 111,461

8 Claims. (Cl. 188—79.5)

This invention relates to brake assemblies of the expanding shoe type and particularly to the shoe clearance adjusting and shoe retracting means associated with assemblies of this type.

It is a primary object of this invention to provide a combination shoe clearance adjusting and shoe retracting return spring mechanism for an expansible, friction type, brake shoe element wherein the shoe return spring anchor point is movable with and is adjusted simultaneously with the adjustment of the clearance between the shoe and the drum element engageable therewith. Such an arrangement limits the deformation of the return spring to that of the clearance space and prevents the development of unduly large stresses and strains in the return spring. As a result relatively small sized, durable, inexpensive shoe return springs may be used and assembly of the brake assembly is easier and less costly.

It is a further object of this invention to associate the brake shoe retracting or return spring with a rotatable, cam-type, shoe clearance adjusting means in such a manner that the anchor point of the return spring is carried by and shifts with each adjustment of the clearance adjusting cam. Such an arrangement provides a means whereby eccentric loading of the shoe adjusting cam by the shoe and the return spring is eliminated when the brake shoe is in its retracted position. Furthermore, during application of the brakes the eccentric turning moments applicable to the adjusting cam are limited to the moments exerted by the relatively small sized, low strength shoe return spring.

It is a further object of this invention to provide a combination brake shoe clearance adjusting and shoe retracting spring mechanism which reduces the magnitude of the eccentric loads applied to the adjusting cam so as to permit the elimination of the conventional high pressure friction washers that are usually associated with shoe clearance adjusting assemblies of this type. By eliminating the conventional high pressure friction washers, assembly of the cam adjusting mechanism is greatly facilitated and adjustment of the shoe clearance adjusting cam is made much easier for it is not necessary to overcome extremely large frictional forces in order to rotate the adjusting cam.

It is an additional object of this invention to provide a brake shoe retracting mechanism that is extremely simple and compact, quite inexpensive, easy to install and reliable in operation.

While this invention is particularly applicable to brake assemblies such as those shown in the copending applications of Robert F. Smith, Serial No. 56,555, filed October 26, 1948, and John P. Butterfield, Serial No. 105,804, filed July 20, 1949, now Patent No. 2,578,285, still, it is thought to be obvious from a consideration of the drawings and the specification below that this invention may be applied to any brake or clutch assembly utilizing expandible friction shoes.

In the drawings:

Fig. 1 is a side elevational view of an expandible shoe brake assembly embodying this invention, certain parts thereof being shown in sectional elevation;

Fig. 2 is an enlarged fragmentary side elevation of a portion of the Fig. 1 assembly disclosing the cam type brake shoe adjusting and return spring mechanism embodying this invention; and Fig. 3 is a sectional elevation taken along the line 3—3 of Fig. 1, the view being somewhat enlarged in size.

Referring to the drawings in detail and particularly to Figure 1, the brake assembly embodying my invention includes the annular brake drum 10 which is adapted to be fixedly mounted on the rotatable member to be braked, such as a motor vehicle road wheel (not shown). The brake shoe supporting and actuating mechanism includes the spaced apart rigid plates 14 that are mounted by bolts 15 on a relatively fixed brake support 13. Support 13 may be a front wheel steering knuckle or the axle housing adjacent the rear wheels of a conventional motor vehicle chassis. The spaced apart plate members 14, which support the brake shoe actuating mechanism on the housing 13, are specifically designed to function as torque plates and thus provide the means for taking the brake reaction between the brake shoes 21 and the brake drum 10. The plates 14 are identical in construction and are each formed with a pair of diametrically disposed, L-shaped seat portions 14a which constitute indentations along the periphery of the plates 14. The seats 14a are adapted to receive the fluid brake shoe actuating motors 31. Plates 14 also include the diametrically disposed portions 14b which are spaced approximately ninety degrees circumferentially from the L-shaped seat portions 14a. Portions 14b of the spaced plates 14 provide slots between which the finger-like projecting portions 23a of the brake shoe web portions 23 may be guidingly mounted. Pins 16 extend through aligned slots in the plates 14 and through openings in the web portions 23a of the brake shoes to loosely anchor the brake shoes 21 to the plates 14.

The brake shoe actuating mechanism for each wheel assembly is mounted on and is positioned between the plate members 14. This actuating mechanism comprises the hydraulically operated motors 31, the pivotally mounted, brake shoe supporting links 41, and the pivot link anchor members 51. As the brake shoes web portions 23a, the pivot links 41, the link anchor members 51, and the actuating motors 31 are all arranged with their force transmitting portions positioned centrally between the plate members 14, an arrangement is provided in which there is little chance for the development of torsional loads or bending moments that would tend to tilt or cock the brake shoes and increase the stress concentrations in the various elements of the brake assembly. This balanced mounting of the brake shoe actuating mechanism and the advantages thereof is clearly set forth in each of the aforementioned copending applications.

Movably mounted between the plate members 14 are the pair of arcuately-shaped brake shoes 21. Each shoe 21 has a lined peripheral flange 22 that is adapted to be frictionally engaged with the inner cylindrically formed surface 11 of the brake drum 10. Each shoe 21 also has a centrally disposed web portion 23 that is adapted to be connected to the aforementioned shoe actuating mechanism in the manner hereinafter described. Each web portion 23 is pivotally connected at one of its ends to the plate members 14 by a pivoted link 41 and the other end of each shoe web portion 23 is connected to a fluid actuating motor 31 that is fixedly anchored in the L-shaped seats 14a of the plates 14. The web 23 of brake shoe 21, near the heel or lower end, is formed with the curved finger-like projection 23a that is adapted to seat in the concavely-shaped mating formation 41a on one end of the pivot link 41. Link 41 extends in the same plane as the web 23 of shoe 21 and has its opposite end formed with a concavely-shaped seat 41b which is adapted to be mounted on the washer-like anchor member 51 that is fixedly mounted between the plate members 14. The curved bearing seats between the shoe web 23, the pivoted link 41 and the plate-supported anchor member 51 permit relative pivotal movement between these engaged elements.

This brake assembly includes the combination brake shoe clearance adjusting and shoe retracting return spring mechanism 60 which constitutes the invention herein claimed. The shoe adjusting and positioning means 60 comprises the square shanked stud 61 which is shaped so as to provide the radially extending collar 62 about a portion of its periphery. Axially spaced from the collar 62 the shank 61 has its corner edges cut away to provide a pair of spaced apart cylindrically-formed bearing journals 63 and 64 respectively. The journals 63 and 64 are adapted to be rotatably mounted in mating, axially aligned, cylindrically-formed openings 14c that pierce the spaced apart support plates 14. Between the journals 63 and 64 the shank 61 is cut away to provide a cylindrically-shaped brake shoe adjusting cam 65. Cam 65 is formed with its axis of rotation parallel to but eccentrically mounted with respect to the axis of rotation of the stud 61. Accordingly, on rotation of the stud 61 the side edges of the cam 65 will work against the side edges of the portion 23b of the brake shoe web portion 23 and will thereby provide a means for actuating the shoe and adjusting the clearance between the brake shoe lined flange 22 and the inner surface 11 of the encircling brake drum 10. Spaced axially from the journal portion 64 is a radially extending, flange-like shank portion 67 that provides a seat on which the brake shoe retracting or pull back spring 71 rests. Outwardly of the shank portion 67 there is formed a cylindrically-shaped, concave-sided return spring anchor post 68. Spring anchor post 68 is preferably axially aligned with the adjusting cam 65 and accordingly is eccentrically mounted with respect to the rotational axis of the stud 61. The portion of the shank 61 extending between the journal 64 and the seat 67 is turned down to cylindrical shape to provide a stud-like anchor portion adapted to be engaged by the C-shaped, spring lock washer 69 that locks the stud 61 to the plates 14. Washer 69 is of arched construction so that when it is forced into position it is flattened and thus tends to anchor the seat 67 of the stud 61 to the adjacent support plate 14. Washer 69 thus provides a means for resisting rotation of the stud 61 due to the frictional engagement between it and the surfaces adjacent thereto.

The brake shoe return or pull back spring 71 herein disclosed is of substantially diamond shape and has its bight portion 71a encircling the stud anchor post 68. Obviously springs of different shapes may also be used in this device. The free ends 71b of the return or pull back spring 71 are located opposite the bight portion 71a of the spring and are inserted through and anchored in the circular opening 23c in the web 23 of the brake shoe 21. This resiliently connects the shoe 21 and the plates 14.

With the arrangement shown it is thought to be apparent that on application of the brakes, outward movement of the brake shoe will only stretch the return spring 71 by the amount of the shoe stroke, that is, the clearance distance between the retracted position of the shoe and the drum. Furthermore, every time the stud 61 is rotated and the brake shoe clearance is adjusted to compensate for shoe lining wear then the location of the return spring anchor post 68 is correspondingly adjusted so that thereafter the shoe pull back spring will not be stretched an increased amount due to past lining wear and increase in the length of the shoe stroke. In the conventional brake assembly the shoe pull back or return spring is connected between opposed shoes or anchored to a fixed support so that as lining wear develops the adjustment of the shoe and drum clearance progressively increases the stroke or elongation of the conventional pull back spring to such a degree that either rugged, stiff springs must be initially used or spring failure will develop at an early stage. The spring arrangement herein disclosed permits use of a relatively small size, flexible shoe pull back spring that will have a more or less constant deformation during brake operation. Consequently the spring will have a very long life. In addition it occupies only a small space within the brake assembly and thereby makes more space available for actuating the mechanism.

In addition to improving the life of the shoe return or pull back spring the mechanism herein disclosed has the added advantage of eliminating eccentric loads or turning moments on the shoe clearance adjusting cam so that it is easier to maintain shoe adjustment without the assistance of heavily loaded friction washers or the like. From Fig. 2 it will be noted that the point of tangency A between the bight portion 71a of the shoe pull back spring 71 and the spring anchor post 68 is diametrically opposite the point of tangency B between the adjusting cam 65 and the contiguous portion 23b of the web 23 of the brake shoe 21 when the brake shoe is in retracted position. As the stud 61 is rotated to adjust the clearance between the shoe and drum the cam 65 will be rotated but the spring anchor post 68 will also rotate an equal amount and the return spring 71 will shift about the opening 23c such that the diametrically opposed relationship between the two aforementioned points of tangency A and B will always be maintained. By having the points of tangency A and B diametrically opposed the forces applied at these two points are diametrically aligned so as to neutralize each other and there are no unbalanced eccentric turning moments acting on the cam 65 tending to rotate it when the brake shoe is in retracted position. This tends to maintain the selected clearance adjustment between the shoe and the associated brake drum. Furthermore, as the return spring 71 snaps the brake shoe back to retracted position the impact between the edge of the shoe web portion 23b and the side of the adjusting cam 65 is always at a point aligned with and opposite the contact point of the spring bight portion 71a and the anchor post 68 therefore the impact of the shoe web 23 against the cam 65 does not produce a turning moment tending to rotate the stud 61. By eliminating such a turning moment the possibility of the stud 61 being rotated so as to vary the shoe clearance adjustment, is greatly reduced.

On application of the brakes the shoe web no longer is positioned against the cam 65 so then the force exerted by the stretched spring 71 acting through the anchor post 68 does have a tendency to eccentrically load the stud 61. However, due to the springs 71 being of relatively small size and low strength, the compressed, C-shaped friction lock washers 69 are able to exert a sufficient force against the seat 67 to prevent rotation of stud 61 during application of the brakes.

It is thought to be obvious from the above description that applicant has provided a combination brake shoe clearance adjusting cam and shoe retracting spring mechanism that improves the life and operation of the brake and facilitates assembly as well as servicing of the brake assembly in addition to providing more space for the shoe actuating mechanism.

I claim:

1. In a brake assembly including a brake drum, a brake support and a brake shoe engageable with said drum that is connected to said support for movement relative thereto in a plane parallel to that of the support, a shoe positioning stud member rotatably mounted on and extending transversely of the support, said stud member including a first portion eccentrically positioned with respect to the axis of rotation of the stud member which portion provides a cam element engageable with the brake shoe and a second portion eccentrically positioned with respect to the axis of rotation of the stud member adapted to provide an anchor post for a shoe retracting spring member, the first and second eccentrically positioned portions being coaxially arranged, and a shoe retracting spring tensioned between and resiliently connecting the anchor post and the brake shoe so as to urge the shoe out of engagement with said drum and into engagement with the cam element.

2. In a brake assembly including a brake drum, a brake support and a brake shoe engageable with said drum that is connected to said support for movement relative thereto in a plane parallel to that of the support, a shoe positioning stud member rotatably mounted on and extending transversely of the support, said stud member including a first portion eccentrically positioned with respect to the axis of rotation of the stud member which portion provides a cam engageable with the brake shoe and a second portion eccentrically positioned with respect to the axis of rotation of the stud member adapted to provide an anchor post for a shoe retracting resilient member, the first and second eccentrically positioned portions being coaxially arranged, a shoe retracting resilient member tensioned between and connecting the anchor post and the brake shoe so as to urge the shoe out of engagement with said drum and into engagement with the cam, and means frictionally engaged between the stud member and the support adapted to resist rotation of the stud member relative to the support.

3. In a brake assembly including a brake support comprising a pair of spaced support plates and a brake shoe having a web portion disposed between and pivotally connected to said support plates for movement relative thereto in a plane parallel to that of the support plates, a stud-like, cylindrically formed member rotatably mounted on and extending transversely of the support plates, said stud member mounting a first axially extending, cylindrically shaped portion eccentrically positioned with respect to the axis of rotation of the stud member which portion provides a cam portion disposed between said plates engageable with the brake shoe web portion, said stud member also providing a second axially extending, cylindrically shaped portion outwardly of said plates and eccentrically positioned with respect to the axis of rotation of the stud member adapted to provide an anchor post for a shoe retracting spring member, the first and second eccentrically positioned stud portions being coaxially arranged, and a shoe retracking spring tensioned between and resiliently connecting the anchor post and the brake shoe so as to urge the shoe into engagement with the cam portion and clip means frictionally engaged between the stud member and the support adapted to resist rotation of the stud member relative to the support.

4. In a brake assembly including a brake support and a brake shoe pivotally connected to said support for movement relative thereto in a plane parallel to that of the support, a stud member rotatably mounted on and extending transversely of the support, the stud member being spaced from the pivotal connections of said shoe to said support, said stud member including a first portion eccentrically positioned with respect to the axis of rotation of the stud member which portion provides a cam element engageable with the brake shoe to adjust the position thereof and a second portion eccentrically positioned with respect to the axis of rotation of the stud member adapted to provide an anchor post for a shoe retracting spring member, the first and second eccentrically positioned portions being coaxially arranged and axially spaced along said stud, and a spring tensioned between and connecting the anchor post and the brake shoe arranged to urge the shoe into engagement with the cam, the point of contact between the cam portion and the brake shoe being diametrically opposed to the point of contact between the shoe retracting spring and the anchor post at retracted position of the brake shoe.

5. In a brake assembly including a brake support and a brake shoe pivotally mounted relative to said support, a combination shoe positioning and shoe retracting device located at a point spaced from the pivotal connection of said shoe to said support, comprising a member rotatably mounted on said support, cam means carried by said member eccentrically mounted with respect to the axis of rotation of said member and engageable with said shoe, anchor means carried by said member eccentrically mounted with respect to the axis of rotation of said member, and resilient shoe retracting means connected between said brake shoe and said anchor means, the cam means and the anchor means on said member being axially spaced and coaxially arranged relative to the axis of rotation of said member.

6. In a brake assembly including a brake support and a brake shoe pivotally connected to said support, a brake shoe positioning and retracting mechanism mounted on said support at a location spaced from the pivotal connection of said shoe to said support, comprising a member rotatably mounted on said support having a cylindrical portion mounting first and second spaced, axially extending, eccentrically positioned, cylindrically formed elements, the first element providing a cam engageable with the brake shoe to control the position of the brake shoe in retracted position and the second element providing an anchor adapted to be engaged by a shoe retracting tension spring, and a tension spring connected between the second element and the brake shoe, and lock washer means mounted on said member having portions thereof frictionally engaged with said member and said support to provide means tending to resist rotation of said member.

7. In a brake assembly including a brake support and a brake shoe pivotally connected to said support, a brake shoe positioning and retracting mechanism mounted on said support at a location spaced from the pivotal connection of said shoe to said support, comprising a member rotatably mounted on said support having a cylindrical portion mounting first and second spaced, axially extending, eccentrically positioned, cylindrically formed elements, the first element providing a cam engageable with the brake shoe to control the position of the brake shoe in retracted position and the second element providing an anchor adapted to be engaged by a shoe retracting tension spring, and a tension spring connected between the second element and the brake shoe, and lock washer means mounted on said member having portions thereof frictionally engaged with said member and said support to provide means tending to resist rotation of said member, the point of application of the force of the retracting spring applied to the member at retracted position of the brake shoe being diametrically opposed to the point of application of the force of the brake shoe applied to the member at retracted position of the brake shoe.

8. In a brake assembly including a brake support and a brake shoe pivotally connected to said support, a stud-like, cylindrically formed member rotatably mounted on said support at a point spaced from the pivotal connection of said shoe and support, said stud member mounting a first axially extending, substantially cylindrically shaped portion eccentrically positioned with respect to the axis of rotation of the stud member, said first portion providing a cam engageable with the brake shoe to position said shoe, said stud member also including a second axially extending, substantially cylindrically shaped portion eccentrically positioned with respect to the axis of rotation of the stud member arranged to provide an anchor post for a shoe retracting, resilient member, the first and second eccentrically positioned portions being axially spaced and coaxially arranged, and a resilient member encircling said anchor post and connected to the brake shoe in a stressed condition to urge the shoe into engagement with the cam, and means frictionally engaged between the stud member and the support adapted to resist rotation of the stud member.

ROBERT F. SMITH.

REFERENCES CITED

The following references are of record in the file of this patent:

UNITED STATES PATENTS

| Number | Name | Date |
|---|---|---|
| Re. 22,515 | Schnell | July 11, 1944 |
| 1,885,174 | Bowen et al. | Nov. 1, 1932 |
| 2,195,261 | Rasmussen et al. | Mar. 26, 1940 |
| 2,337,069 | Spiller et al. | Dec. 21, 1943 |
| 2,365,715 | Mattersdorf | Dec. 26, 1944 |